(No Model.) 2 Sheets—Sheet 2.
H. K. WHITNER.
MECHANICAL MOVEMENT.
No. 363,103. Patented May 17, 1887.

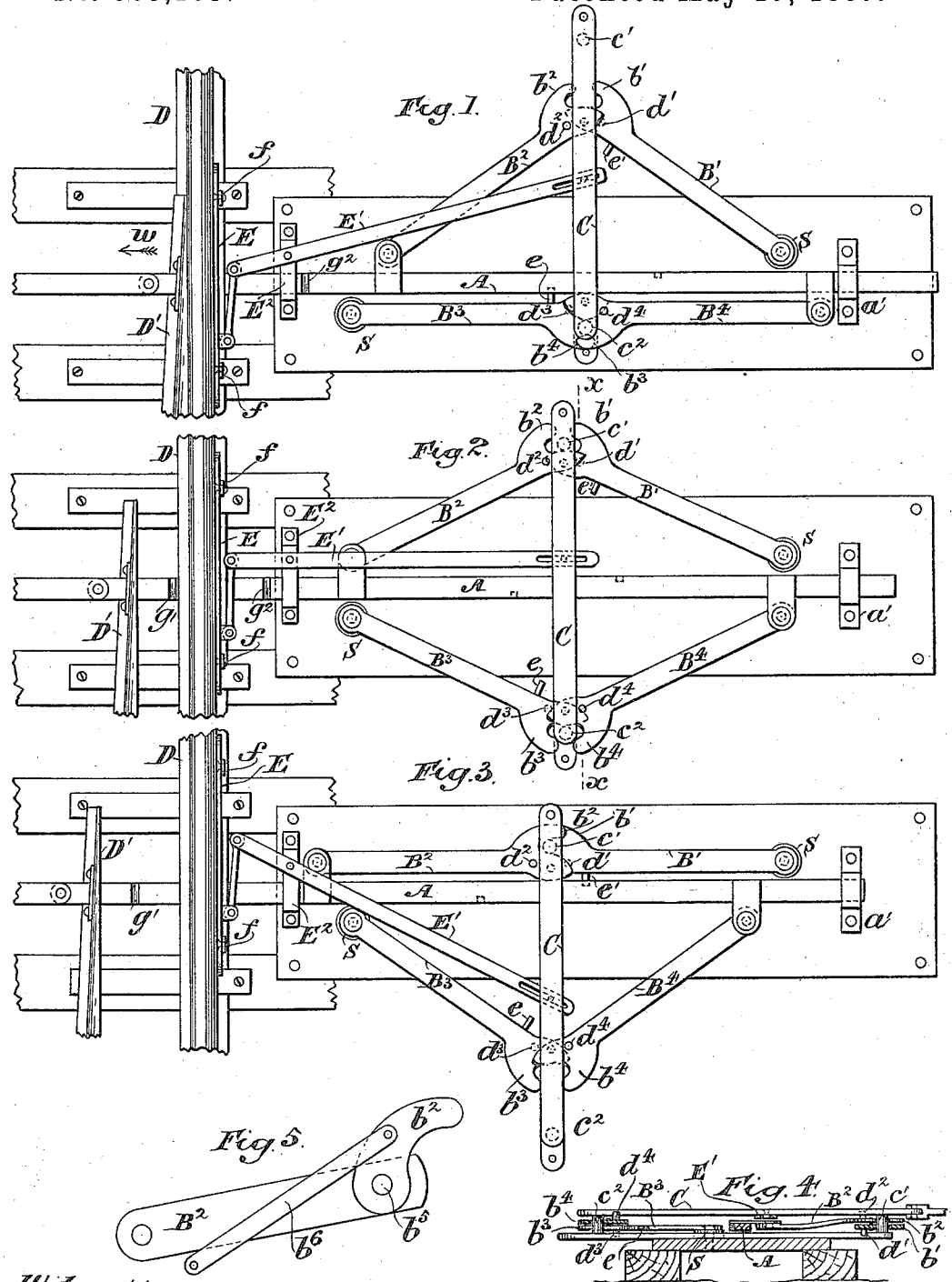

Witnesses
Chas. T. Ward
Maurice J. Roach

Inventor
Hiram K. Whitner
by his attys
Gifford & Brown

UNITED STATES PATENT OFFICE.

HIRAM K. WHITNER, OF NEW YORK, N. Y., ASSIGNOR TO THE WHITNER AUTOMATIC SAFETY BRAKE COMPANY, OF NEW HAVEN, CONNECTICUT.

MECHANICAL MOVEMENT.

SPECIFICATION forming part of Letters Patent No. 363,103, dated May 17, 1887.

Application filed November 16, 1886. Serial No. 219,078. (No model.)

*To all whom it may concern:*

Be it known that I, HIRAM K. WHITNER, of New York, in the county and State of New York, have invented a certain new and useful Improvement in Mechanical Movements, of which the following is a specification.

I will describe a mechanical movement embodying my improvement, and then point out its various novel features in the claims.

Figure 6:
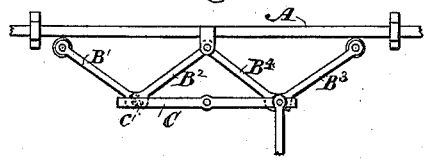
Figure 7:
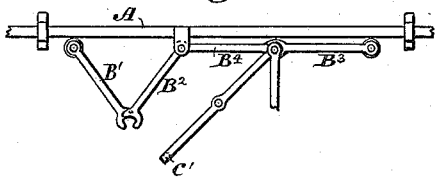
Figure 8:
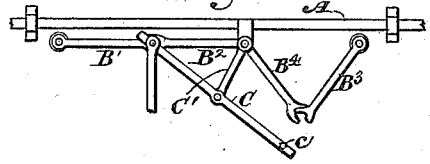
Figure 9:
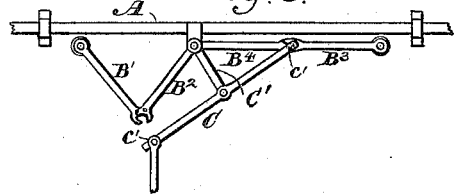
Figure 10:
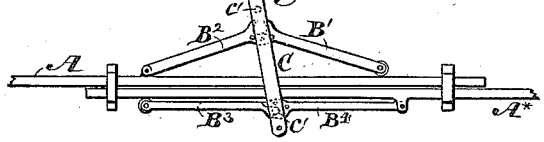
Figure 11:
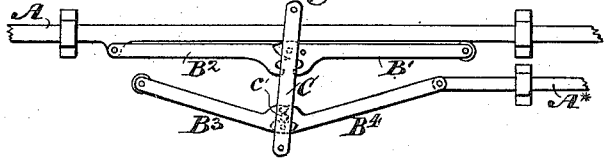

In the accompanying drawings, Figure 1 is a plan or top view of a mechanical movement embodying my improvement and part of a railway-rail, a switch, and appurtenances with which the same may be combined, the mechanical movement being represented in one of its several conditions. Fig. 2 is a similar view showing the mechanical movement in another condition. Fig. 3 is a like view showing the mechanical movement in still another condition. Fig. 4 is a transverse section of the mechanical movement, taken at the plane of the dotted line $xx$, Fig. 2. Fig. 5 is a plan or top view of one of four arms comprised in the mechanical movement, this arm having a modified construction as compared with the arms shown in the other figures. Fig. 6 is a plan view of a modification of this mechanical movement. Fig. 7 is a similar view of this last modification, but showing its parts in a different position. Fig. 8 is a similar view of another modification of this mechanical movement. Fig. 9 is another and similar view of the last modification with its parts in a different position. Figs. 10 and 11 are plan views of modifications wherein two rods are operated by the toggle-arms. Fig. 11 is a plan of another modification wherein two rods are operated by the toggle-arms.

Similar letters of reference designate corresponding parts in all the figures.

In Figs. 1 to 9, inclusive, A designates a rod which is to be shifted longitudinally into different positions and locked in its extreme positions. This rod may be used for shifting and locking a railway-switch, as shown in Figs. 1, 2, 3, and 4, or for any other purpose. As shown in the figures just enumerated, it is fitted in a guide, $a'$, consisting of a staple or strap. At one end it is connected to the railway-switch. The rod may of course be guided in various ways to subserve the same purpose. The rod A in the diagrammatic views is intended to be suitably guided.

$B'$ $B^2$ $B^3$ $B^4$ designate four arms, which are combined with the rod A and with a traverse-bar, C, for imparting longitudinal movements to the rod A and locking it. I will first describe the construction and operation of these parts as they are illustrated in Figs. 1, 2, 3, and 4. The arms $B'$ $B^3$ are pivotally connected at their remote ends to supports S, which are arranged adjacent to the rod A. The remote ends of the arms $B^2$ $B^4$ are pivotally connected to the rod A. The arms $B'$ $B^2$ are pivotally connected together, and the arms $B^3$ $B^4$ are pivotally connected together. In the present example of my improvement the arms $B'$ $B^2$ are arranged on one side and the arms $B^3$ $B^4$ on the other side of the rod A.

In the present example of my improvement the location of the points at which the remote ends of the arms $B'$ $B^3$ are pivotally connected to the supports S bears such relation to the points at which the arms $B^2$ $B^4$ are connected to the rod A that when the pair of arms $B'$ $B^2$ and the pair of arms $B^3$ $B^4$ are equally deflected from the rod A, as shown in Fig. 2, the points at which the arms $B^2$ $B^4$ are connected to the rod A will be opposite the points at which the remote ends of the arms $B'$ $B^3$ are connected to the supports S. This relation is desirable, but not by any means essential to my improvement.

The traverse-bar C coacts with the pairs of arms $B'$ $B^2$ $B^3$ $B^4$, but is not connected thereto. The pairs of arms have jaws at their connected ends, and these jaws close at times over or around pins $c'$ $c^2$, with which the traverse-bar is provided, and open at other times to release such pins. The jaws of the arms $B'$ $B^2$ are marked $b'$ $b^2$, and the jaws of the arms $B^3$ $B^4$ are marked $b^3$ $b^4$. The jaws $b'$ $b^2$ coact with the pin $c'$ of the traverse-bar, and the jaws $b^3$ $b^4$ coact with the pin $c^2$ of such bar. It will be seen that when the traverse-bar C is in a position half-way between either of its extreme positions, as shown in Fig. 2, the pins $c'$ $c^2$ are in contact with the arms $B'$ $B^2$ $B^3$ $B^4$. When the bar C is moved out of this position, which is represented by Fig. 2, one of the pins $c'$ $c^2$ will be removed from the arms with which it contacted, and the other of said pins will be embraced by the jaws of the arms with which it coacts.

I will explain the operation of the traverse-bar and arms more particularly with reference to the parts shown as combined with them in this example of my improvement.

D designates one of a pair of rails in a railway.

D' designates one of a pair of switch-rails, which, as here shown, are connected to and shifted by the rod A. The traverse-bar C may be operated by any convenient means extending from it to a place where a switchman is stationed. A convenient mechanism for operating it will consist of rods or links and bell-crank levers, such as are ordinarily used for imparting motion to switch-operating mechanism of common forms.

When the switch-rails D' are to be adjusted into proximity with the rails D, the traverse-bar C is shifted into the position in which it is represented by Fig. 1. When this is done, the arms $B^3 B^4$ will have been swung into line with each other, and as their meeting ends are connected close to that edge of the arms which is adjacent to the rod A, any force tending to move the switch-rails D' in direction of arrow $w$ will be resisted by the arms $B^3 B^4$. This will be due to the fact that such force would tend to swing the arms toward the rod A, and the pin $c^2$, fitting between the jaws of these arms, will preclude and stop or prevent such action. The movement of the traverse-bar into this position (represented by Fig. 1) will also have caused the arms $B' B^2$ to have been swung outward away from the rod A as far as possible. In swinging outwardly their jaws $b' b^2$ will have been opened, so as to disengage them from the pin $c'$, and the pin $c'$ will have been moved far beyond said jaws.

I may here call attention to the fact that the traverse-bar C will preferably be made of two portions, one arranged above the other, and connected by the pins $c' c^2$. When thus made, one of its portions will preferably extend below the arms $B' B^2 B^3 B^4$ and rod A, and the other portion above these parts.

The traverse-bar C may be guided in its movements by any suitable contrivance upon the ground or other support, such as bearings or radius-bars; but it will be found sufficient to provide guides upon the arms $B' B^2 B^3 B^4$ for that purpose. I have shown such guides, consisting of pins $d' d^2 d^3 d^4$, arranged on said arms.

Although the arms $B^3 B^4$ will securely lock the rod A in position, yet, if preferable, one of said arms may be provided with a pin, $e$, which will enter a transverse hole or groove in the rod A whenever said arms $B^3 B^4$ are swung inward close to the rod A.

In lieu of or in addition to locking the rod A by the means already described, I may cause a detector-bar, E, which I have shown, to lock the rod. This detector-bar is shown as supported close to one of the rails D by radius-arms $f$, and combined with a lever, E', that is fulcrumed on a support, $E^2$, between the ends and connected near one end to the traverse-bar C by means of a pin affixed to the latter and passing through a longitudinal slot in said lever. When the traverse-bar is shifted into its extreme positions, the lever E' will be vibrated and thus caused to move the detector-bar in the direction of the length of the latter. Owing to the manner in which the detector-bar is supported it will necessarily be elevated in order that it may be shifted from one to another of its extreme positions. It cannot, therefore, be shifted from one to the other of these positions while the wheel of a car is over it. The inability of the switchman to shift the switch at such time indicates the presence of a train there. In moving to either of its extreme positions the detector-bar descends. Therefore, by providing transverse grooves $g'$ $g^2$ at such parts of the rod A as will be opposite the detector-bar when the latter is in its extreme positions, the detector-bar may be made to engage with the rod A to lock it, and hence to secure the switch-rails.

When the traverse-bar is moved into the position shown in Fig. 3, the arms $B' B^2$ will be brought into line close to the rod A, and the arms $B^3 B^4$ will be swung away as far as possible from the rod A. In short, the operation of the two pairs of arms will be exactly the reverse in every respect from their operation when in the positions illustrated in Fig. 1. The arms $B' B^2$ may be provided with a pin, $e'$, which will operate like the pin $e$, but to secure the rod A in another position.

It will be seen that the traverse-bar moves a greater distance transversely of the rod A than either pair of arms. Owing to this there will be a differential movement of the pairs of arms, and consequently a differential movement of the rod A, when adjusted from one of its extreme positions to the other. Indeed, the arms will shift the rod A throughout its range of motion, and then lock it in their final movements when they swing into line. The detector-bar will also have a differential movement.

The pairs of arms constitute in effect pairs of toggles. The traverse-bar C operates upon these pairs of toggles at a point of such advantage that power is economized in the operation of the rod A.

In Fig. 5 I have shown that, if desirable, I may impart to the jaws of the arms $B' B^2 B^3 B^4$ a swinging movement relatively to the arms themselves. I have only illustrated this feature in connection with one of the arms. Its jaw is pivotally connected to it by a pin, $b^5$, and is pivotally connected to one end of a rod, $b^6$, which at the other end is pivotally connected to the ground, or some other support at a point distant from the point where the arm is pivoted to its support. This will be especially desirable when the arms $B' B^2 B^3 B^4$ have little movement, or when the jaws are inward of the points at which the arms are connected together, as shown in Fig. 11.

In Figs. 6 and 7 I have shown two pairs of arms, B' B² B³ B⁴, arranged on the same side of the rod A, instead of one pair being arranged at each side thereof, as in the example of my improvement first described. In this example of my improvement (illustrated by Figs. 6 and 7) the remote ends of the arms B' B³ are pivotally connected to supports S, and their adjacent ends are pivotally connected to arms B² B⁴, which are at the other ends pivotally connected to the rod A. Instead of a traverse-bar which operates with a reciprocating motion, as in the example of my improvement first described, I here employ a rocking bar or lever, C, fulcrumed between the ends, and provided near the ends with pins c' c². The pairs of arms B' B² B³ B⁴ are provided at their meeting ends with jaws, as in the other example of my improvement. When the bar C is rocked, so as to straighten out one pair of arms into line and proximity with the rod A, the jaws of this straightened pair of arms will embrace the pin of the bar C with which they coact. When one pair of arms is thus straightened out, the movement of the rod A and of the bar C will cause the other pair of arms to be swung as far away from the rod as possible. Each arm of the bar C in rocking away from the rod A moves farther than the pair of arms with which such arm coacts. Its pin, therefore, in this movement becomes disengaged from the arms, the jaws of the arms being opened to permit of this. The lever may be rocked by means of a rod extending to it. The rod A may be employed to operate a switch-rail or any other article required with like movement or a reciprocating movement.

In Figs. 8 and 9 I have shown still another modification of my improvement, involving the arrangement of two pairs of arms, B' B² B³ B⁴, upon the same side of the rod A. The arms B' B³ are pivotally connected at their remote ends to supports S, and at their adjacent ends are pivotally connected to arms B² B⁴, that are connected pivotally with a crank-arm, C', extending from a rocking bar or lever, and the pairs of arms operate in the same way as in the example of my improvement which is illustrated by Figs. 6 and 7. The crank-arm is connected with the rod A. The lever may be operated by any suitable means—as, for instance, a rod connected to one end.

In Fig. 10 two rods, A A*, are employed. They are supported and guided so as to be capable of independent movement. The arms B' B² coact with the rod A and the arms B³ B⁴ with the rod A*. The traverse-bar C operates in conjunction with the toggle-arms, as in the first-described example of my improvement. Obviously, in the present example of my improvement each rod will at one period of its action move while the other is motionless.

In the example of my improvement shown in Fig. 11 two rods, A A*, are used. They are guided to move lengthwise. They have pairs of toggle-arms B' B² and B³ B⁴ connected with them. The jaws of these arms are on the adjacent instead of the remote or distant sides of the pairs of arms. The traverse-bar needs only one pin, c'. It will be seen that in this example of my improvement the pin of the traverse-bar is engaged with the jaws of the toggle-arms when the latter are wholly flexed or swung outward and disengaged therefrom when they are straightened into line, because the jaws are opened by the adjustment of the arms into the latter position and closed by the adjustment of the arms into the reverse or first-named position.

What I claim as my invention, and desire to secure by Letters Patent, is—

1. A mechanical movement having in combination a rod or rods, toggle-arms provided with opening and closing jaws, a bar serving to impart motion to the toggle-arms, and provided with a pin for engaging with the jaws of the toggle-arms, substantially as specified.

2. A mechanical movement having in combination a rod or rods, two pairs of toggle-arms acting in conjunction with the same, and a bar for imparting motion to the pairs of toggle-arms, the said toggle-arms being provided with jaws which open and close to engage with a pin or pins on the operating-bar, and one of each pair of arms being connected to the rod or one of the rods which said arms are to operate and the other to a support independent of the rod or rods, substantially as specified.

3. A mechanical movement having in combination a rod or rods, two pairs of toggle-arms for actuating the same, arranged one pair on each side thereof, and a traverse-bar arranged transversely to the rod or rods and to the pairs of arms, said toggle-arms being provided with jaws, which open and close to engage with a pin or pins on the traverse-bar, and one of each pair of arms being connected to the said rod or one of the rods and the other to a support independently of the rod or rods, substantially as specified.

4. The combination of main rails and switch-rails forming part of a railway, a rod for operating the switch-rails, pairs of toggle-arms serving to operate the rod and connected to the rod and to supports independently thereof and having jaws at their connected ends, a rod provided with pins, which may engage with the jaws of the arms so as to impart motion to the arms, a detector-bar adjacent to one of the main rails, and a lever connected to the detector-bar and to the bar which imparts motion to the toggle-arms, substantially as specified.

5. The combination of a rod, a pair of toggle-arms connected together and connected one to the rod and the other to an independent support, a bar serving to impart motion to the toggle-arms, and a pin carried by the toggle-arms, and serving to engage with the said rod and lock it, substantially as specified.

6. The combination of a rod, a pair of toggle-arms connected together and connected, one to the rod and the other to an independent support, a bar for imparting motion to the arms, another bar for engaging with a transverse groove in the rod, so as to lock the same, and a lever connected at one end to the said locking-bar and at the other end to the bar that imparts motion to the toggle-arms, substantially as specified.

7. The combination, with a pair of toggle-arms, of jaws arranged at the meeting ends at one side of the point at which the arms connect, and a pin for entering the jaws and preventing them from deflecting or swinging in that direction in which they would otherwise swing on the application of force in the direction of their length, substantially as specified.

8. The combination, with a toggle-arm, of a jaw pivotally connected to the arm and a rod for swinging said jaw relatively to the arm, substantially as specified.

9. The combination of a pair of toggle-arms having jaws which work past each other with a shearing action in closing and a pin for engaging with said jaws, substantially as specified.

HIRAM K. WHITNER.

Witnesses:
D. H. DRISCOLL,
EDWIN H. BROWN.